May 9, 1944.   H. T. KRAFT ET AL   2,348,550
WHEEL
Filed Oct. 11, 1941

INVENTORS
*Herman T. Kraft*
*Joseph Ian Kozopas*
BY *Evans & McCoy*
ATTORNEYS

Patented May 9, 1944

2,348,550

UNITED STATES PATENT OFFICE 2,348,550

WHEEL

Herman T. Kraft and Joseph Ian Kozopas, Akron, Ohio, assignors to The General Tire & Rubber Company, Akron, Ohio, a corporation of Ohio Application October 11, 1941, Serial No. 414,658

8 Claims. (Cl. 301—6)

This invention relates to wheels, and more particularly to wheels made in part of metal stampings and used in connection with pneumatic tires.

It is an object of the invention to provide a generally improved wheel structure of the character mentioned in which one or more brake drums is provided and serves as a radial support.

Another object is to provide a wheel that is light in weight and in combination with a pneumatic tire presents a streamline contour suitable for use on aircraft.

A further object of the invention is to provide a wheel construction in which sheet metal stampings are combined with a cast hub member to provide increased strength at less cost. More specifically, the invention aims to provide a wheel in which the sheet metal stampings are so assembled and arranged as to provide greater strength with a minimum of parts.

Figure 1:
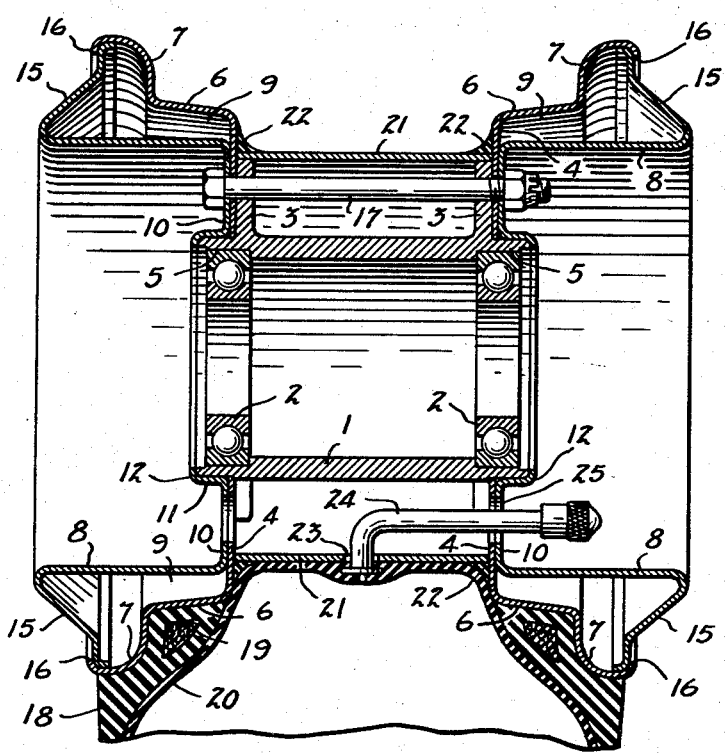
Figure 2:
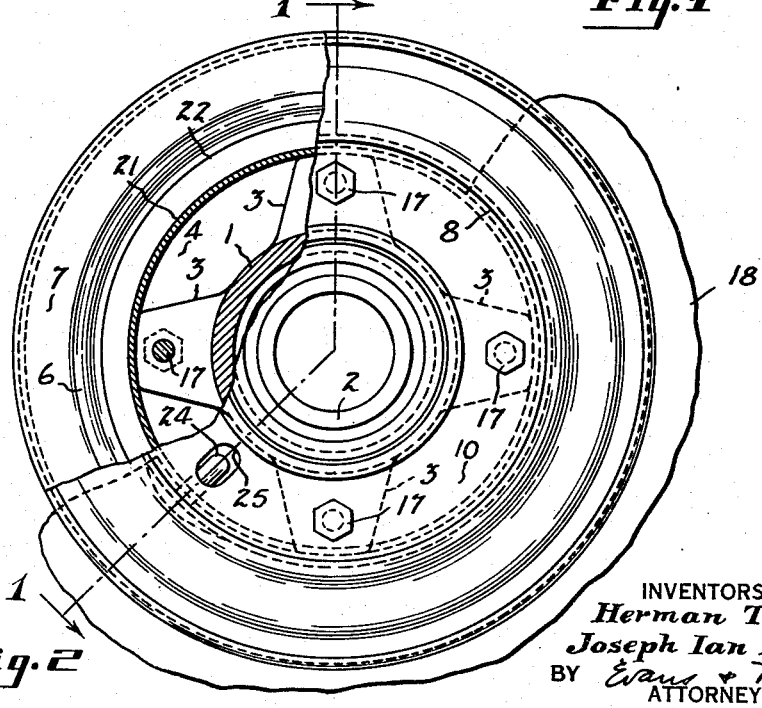

Another object is to provide a generally improved wheel structure of simple design which is economical to make and assemble. Other objects and advantages will become apparent from the following detailed description of a suitable embodiment of the invention made in connection with the accompanying drawing, wherein:

Figure 1 is a sectional view through the axis of the wheel showing a fragment of a pneumatic tire and tube mounted thereon. The section is taken substantially along the line 1—1 of Fig. 2; and Fig. 2 is a side elevational view, partly in section and with parts removed, of the wheel and tire shown in Fig. 1 and on a reduced scale.

The wheel of the present invention is constructed primarily of steel stampings, although, of course, other material can be employed and the parts may be made other than by stamping. The several parts may be electrically welded together in accordance with well known practice. Referring to the drawing by numerals of reference which indicate like parts throughout the figures, the wheel comprises a hub member 1 of generally tubular form and which is preferably made by casting. If the wheel is to be used for aircraft the hub 1 may be formed of a suitable aluminum alloy for lightness, while a heavier metal such as cast steel may be used when lightness is not an essential characteristic. The hub 1 is suitably formed at its ends to receive bearings 2 of conventional character. On the outside of the hub member adjacent but spaced inwardly from the ends thereof are integral radially projecting flanges 3. Against these flanges are disposed circular load carrying disks 4 that are centrally apertured to receive and embrace end portions 5 of the hub. The outermost peripheral portions of the disks 4 are formed into integral tire bead flanges, each comprising a bead supporting portion 6 and a bead retaining portion 7.

Brake drums 8, preferably of cylindrical form according to current practice, and of less diameter than the supporting portions 6 of the tire bead flanges, are disposed within the latter, providing annular separating spaces 9. The spaces 9 insulate the drums from the tire beads and reduce the flow of heat from the brake drums to the tire. The inner ends of the brake drums abut against the supporting disks 4 and are formed with integral radial inwardly directed circular flanges 10 that lie flatwise against the disks 4. The inner peripheries of the flanges 10 are formed with cylindrical portions 11 that embrace the ends 5 of the hub 1 and lip portions 12 that overlie the ends of the hub.

The outer ends of the drums 8 are formed with integral radial outwardly directed flanges 15 that are overlapped by, and as indicated at 16, are interlocked with the outer peripheral edge of the bead retaining portion 7 of the tire bead flange.

While, as previously mentioned, the several parts of the wheel may be secured together by electrical welding, they may be held in assembled relation in addition to the welding or in lieu thereof by bolts 17 which pass through aligned openings in the flanges 3 at the opposite ends of the hub 1 and also in the load supporting disks 4 and inturned flanges 10 of the drums 8.

The tire to be mounted on the wheel of the present invention may be of the usual streamlined type and is indicated at 18 in the drawing. It is formed with beads 19 that embrace the portions 6 of the bead flange and is inflated by means of an inner tube 20. Extending between the load supporting disks 4 and abutted against the inside surfaces of the latter is a tubular reinforcing member 21 that is embraced by the inner tube 20 when the latter is inflated. The member 21, which may be of cylindrical form, is supported on the outer ends of the flanges 3, which prevent radial shifting thereof. The reinforcing tube 21 is of less diameter than the bead supporting portions 6 of the tire bead flange to provide the conventional drop-center construction. Fillets 22, which may be of rubber, are provided at the juncture between the tube 21 and the load supporting disk 4. An opening 23 is provided in the reinforcing tube 21 to receive a bent inflated stem 24 attached to the inner tube 20. This stem projects laterally through one of several openings 25 provided in the disks 4 and inturned flanges 10 between the flanges 3 of the hub.

It is to be noted that as an important feature of the present invention the radial outwardly directed flanges 15 which extend between the outermost ends of the brake drums 8 and the tire bead flanges are of conical form and thereby reinforce the tire bead flanges to prevent axial displacement thereof when the wheel is subjected to axial thrusts.

The principles of the present invention may be utilized in various ways, numerous modifications and alterations being contemplate, substitution of parts and changes in construction being resorted to as desired, it being understood that the embodiment shown in the drawing and described above is given merely for purposes of explanation and illustration without intending to limit the scope of the claims to the specific details disclosed.

What we claim is:

1. A wheel comprising a hub and a tire supporting body provided with a radial load carrying disk on one end of the hub having an integral tire bead flange at its outer periphery, a braking drum having an inturned flange disposed against said disk and an integral out-turned flange overlapped with the tire bead flange, and a reinforcing member having connection with the hub and with the disk adjacent the outermost part of the latter.

2. A wheel comprising a hub and a tire supporting body provided with a radial load carrying disk on each end of the hub, said disks each having an integral tire bead flange at its outer periphery, a braking drum abutting one of the disks and having an inturned flange disposed against said one disk and an out-turned flange overlapped with the tire bead flange of such disk, and a tubular reinforcing member disposed about the hub between the disks and abutted against the latter.

3. A wheel comprising a hub and a tire supporting body provided with a radial load carrying disk secured to one end of the hub and having at its outer periphery an integral tire bead flange, a cylindrical braking drum having at one end a radial inwardly directed flange disposed flatwise against one side of the disk and in circumferential embracing relation to the hub and at the other end an integral radial outwardly directed flange connected at its outer periphery to the tire bead flange, and a tubular member abutted against the other side of the disk.

4. A wheel comprising a hub having integral radial flange means at one end and a tire supporting body provided with a radial load carrying disk secured to said end of the hub and having a tire bead flange, a braking drum having an inturned flange disposed against said disk and an out-turned flange connected to the tire bead flange, and a tubular member supported by the flange means of the hub and disposed about the hub, said member being abutted against the disk to reinforce the latter.

5. A wheel comprising a hub having a radial projection adjacent each end, a pair of circular, apertured sheet metal members disposed about each end of the hub, the members of each pair being disposed flatwise against one another and against the outer face of one of said projections, the outer peripheral margins of each pair of members being connected for mutual support and the intermediate portions of the members between the outer peripheries thereof and the flatwise disposed portions being substantially entirely separated and spaced from one another, and a tubular member disposed about the hub and between said pairs of sheet metal members, said tubular member engaging the radial projections on the hub with each end abutting one of the sheet metal members.

6. In a wheel comprising a tire supporting body and a hub having a radial projection, a member constituting a tire bead support and a member constituting a brake drum disposed about one end of the hub and flatwise against one another and against said projection, said members each being formed of a single piece of sheet metal and being connected together at their outer peripheries and substantially entirely separated from one another throughout their intermediate portions between said peripheries and said flatwise disposed portions, and a tubular member disposed about the hub and mounted on said radial projection.

7. A wheel comprising a hub having radial projections on the ends thereof, sheet metal disk means disposed against the hub projections and providing tire bead supports, and a tubular member disposed about the hub and mounted on the radial projections of the latter, the ends of said member abutting the disk means and held thereby against axial shifting.

8. In a wheel of the character described a hub having radial projections adjacent each end, a disk having an inner portion abutting the outer face of each of said projections, each disk having an axially outwardly extending bead seating portion and a bead retaining flange, a tubular member mounted on said radial projections and bridging the space between said disks, and a brake drum member having an inner portion disposed against the outer face of the inner portion of one of said disks, a drum portion extending axially outwardly beyond the disk flange and spaced radially inwardly from the bead seating portion of the disk and an outer inclined peripheral portion extending from the outer end of the drum portion and joined to the disk flange.

HERMAN T. KRAFT.
JOSEPH IAN KOZOPAS.